(No Model.)

J. W. BRADSHAW & L. C. RICHARDSON.
BROOM.

No. 248,252. Patented Oct. 11, 1881.

Witnesses:
N. C. McArthur.
W. R. Keyworth.

Inventors:
J. W. Bradshaw
L. C. Richardson
per W. A. Alexander
associate Attorney.

UNITED STATES PATENT OFFICE.

J. WILLIAM BRADSHAW AND LEWIS C. RICHARDSON, OF INDIANAPOLIS, INDIANA; SAID RICHARDSON ASSIGNOR TO SAID BRADSHAW.

BROOM.

SPECIFICATION forming part of Letters Patent No. 248,252, dated October 11, 1881.

Application filed May 2, 1881. (No model.)

*To all whom it may concern:*

Be it known that we, J. WILLIAM BRADSHAW and LEWIS C. RICHARDSON, both citizens of the United States, residing at Indianapolis, in the county of Marion and State of Indiana, have invented a new and useful Improvement in Brooms, of which the following is a specification.

The object of this invention is to secure brooms to their handles in a simple, strong, and durable manner; and to this end it consists in the peculiarities of construction, such as will be hereinafter more specifically set forth and claimed.

In order to enable others skilled in the art to avail themselves of the benefits of our invention, we will now proceed to describe it, referring to the accompanying drawings, in which—

Figure 1:
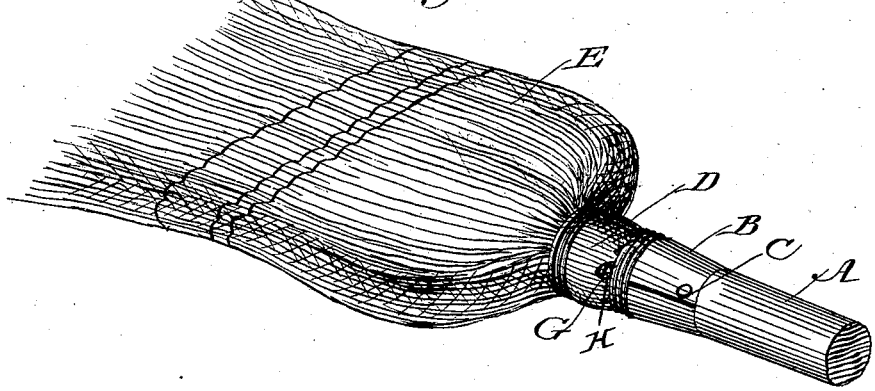
Figure 2:
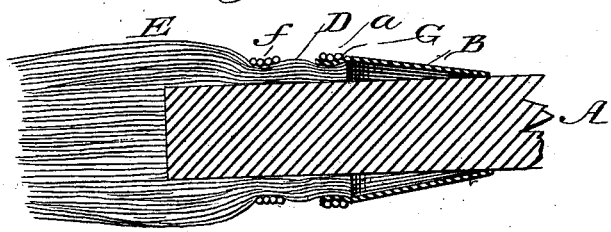
Figure 3:
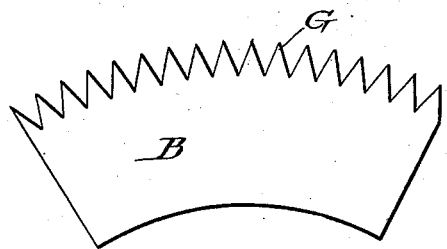
Figure 4:
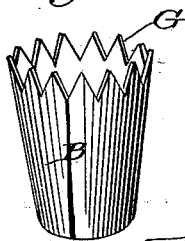

Figure 1 represents a perspective view of a broom, showing our invention applied. Fig. 2 is a sectional view of the same. Fig. 3 is a plan view of the collar-blank, and Fig. 4 is a perspective view of the collar ready for application.

A indicates the broom-handle, and E the broom, the upper or butt ends of the straws being secured to the handle by the following means.

B refers to a metal collar, which is formed with a line of serrations, G, at one end. The collar is placed around the handle, which passes down into the broom, as usual; but the butt-ends of the straws extend only under the teeth, and terminate at their base. In order to bind these teeth upon the broom-straws so as to clamp the latter upon the handle, we bind a wire, $a$, around the teeth into a number of coils sufficient to conceal the teeth, and at the lower end of the coil secure a tack, pin, or screw, H, by passing the same through the straws and into the handle. Prior to forming this coil we wrap the wire around the straws lower down upon the broom to form the coil $f$, and then pass the wire up under the straws to a point where it is brought out to form the coil $a$ around the teeth of the collar.

It will be seen that in wrapping the wire around the teeth the collar is drawn together and caused to tightly grasp the handle, and is then secured at its upper end by a tack or screw, C.

Having thus described our invention, what we claim, and desire to secure by Letters Patent, is—

In combination with a broom, the slit or open ferrule B, adapted to contract as the wire is wound around it, and provided with serrations G G, all substantially as and for the purpose set forth.

In testimony whereof we have signed our names to this specification in the presence of two subscribing witnesses.

J. WILLIAM BRADSHAW.
LEWIS C. RICHARDSON.

Witnesses:
 E. O. FRINK,
 G. H. RENNETT.